(No Model.) 2 Sheets—Sheet 1.
W. T. GRANT.
GATE.
No. 426,441. Patented Apr. 29, 1890.
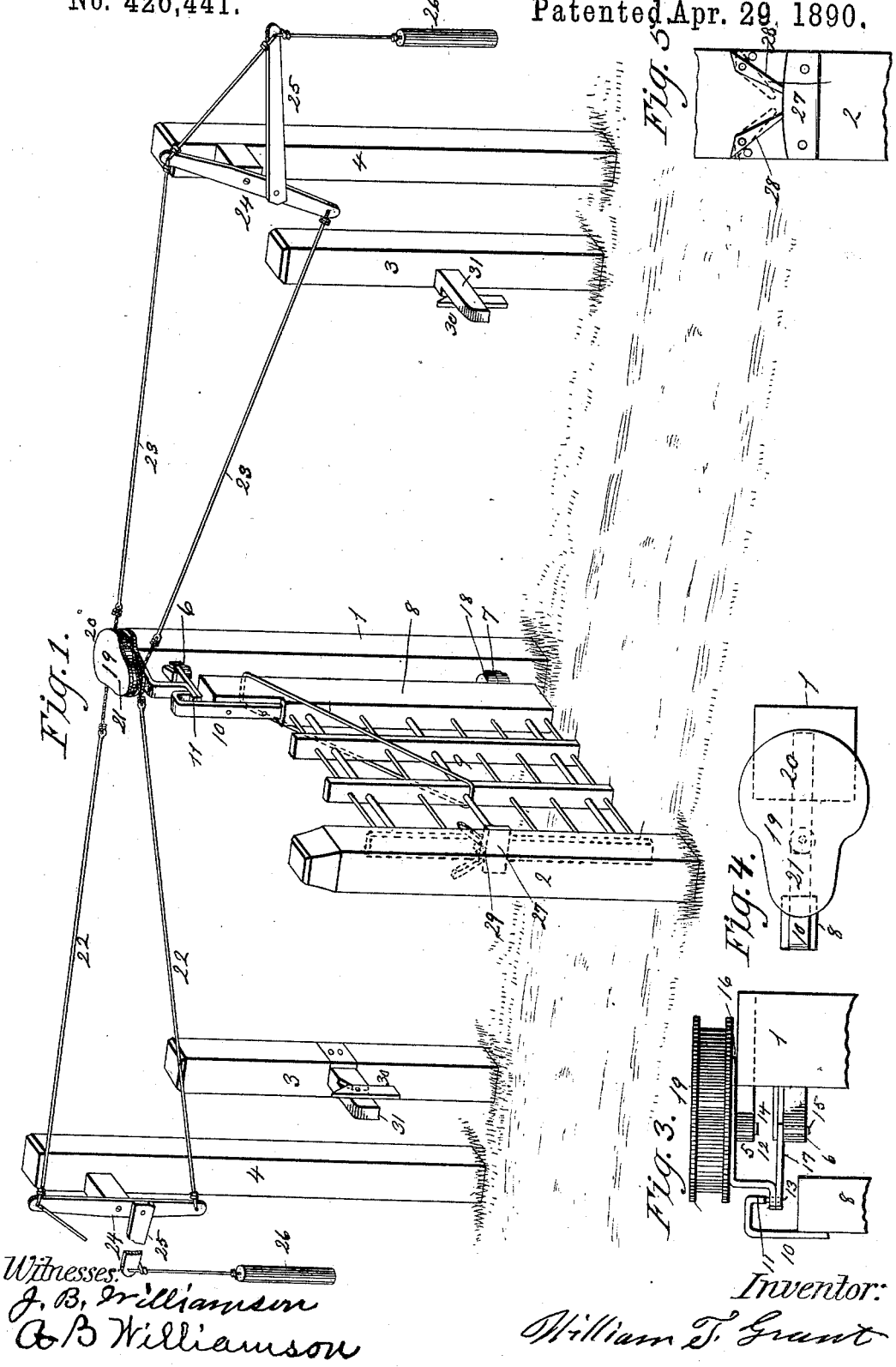
Witnesses:
J. B. Williamson
A. B. Williamson
Inventor:
William T. Grant (No Model.) 2 Sheets—Sheet 2.
W. T. GRANT.
GATE.
No. 426,441. Patented Apr. 29, 1890.
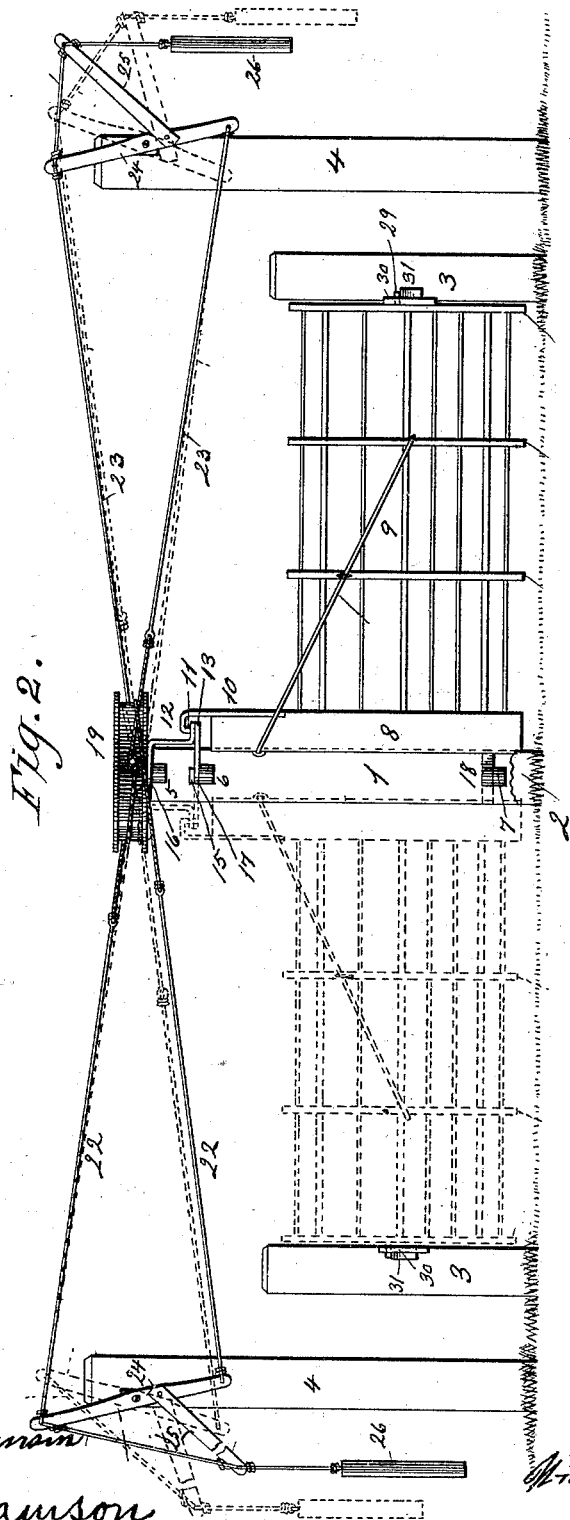
Witnesses:
J. B. Williamson
A. B. Williamson
Inventor:
William T. Grant

UNITED STATES PATENT OFFICE.

WILLIAM T. GRANT, OF JACKSONVILLE, ILLINOIS.

GATE.

SPECIFICATION forming part of Letters Patent No. 426,441, dated April 29, 1890.

Application filed June 11, 1889. Serial No. 313,931. (No model.)

*To all whom it may concern:*

Be it known that I, WILLIAM T. GRANT, a citizen of the United States, residing at Jacksonville, in the county of Morgan and State of Illinois, have invented certain Improvements in Swinging Gates; and I hereby declare the following to be a full, clear, and exact description of the same, which will enable others skilled in the art to which it appertains to make and use the same.

My invention relates to hand-operated swinging gates; and it consists in the improved construction and arrangement or combination of parts, hereinafter fully disclosed in the description, drawings, and claim.

The objects of my invention are, first, to provide an improved device for tilting and swinging a gate, and, second, to provide an improved form of pulley for the ropes by which the gate is operated. These objects are attained in the gate illustrated in the accompanying drawings, forming part of this specification, in which the same reference-numerals indicate the same parts in all the figures, and in which—

Figure 1 represents a perspective view of my improved gate; Fig. 2, a side elevation showing the gate open; Fig. 3, a detail side view of the upper ends of the hinge-post and hinge-stile of the gate and of the devices thereupon; Fig. 4, a detail top plan view of the same parts, and Fig. 5 a detail view of the preferred form of the catch upon the hinge-post.

In the drawings, the numeral 1 indicates the hinge-post. 2 indicates the latch-post. 3 3 indicate the retaining or abutment posts, which are in a line with the hinge-post, and 4 4 the posts for the operating-levers.

Two sockets or eyes 5 and 6 project from the face of the hinge-post near its upper end, and a socket or eye 7 projects near the lower end thereof. The upper end of the hinge-stile 8 of the gate 9 has an upwardly and inwardly projecting bar 10 secured to it, having a pintle 11 upon its end, which projects downward above the middle of the upper end of said stile. A two-armed frame 12 has a socket or eye 13 at its end, into which said pintle 11 fits, and has two downwardly-projecting pintles 14 and 15 upon its upper and lower arms 16 and 17, which may fit and turn, respectively, in the upper and lower sockets or eyes 5 and 6 upon the hinge-post. A pintle 18 upon the hinge-stile of the gate fits in the lowermost socket or eye 7 upon the hinge-post. A flanged pulley 19 is secured to the upper arm 16 of the two-armed frame 12, and said pulley consists of a circular portion 20 and an eccentric narrower portion or bulge 21, which projects over said upper arm 16. Wires, cords, or chains 22 and 23 are secured to the periphery of said eccentric or cam pulley 19, are wound around the same in opposite directions, so as to cross each other, and pass away from the same in opposite directions, so as to have their respective ends secured to the ends of two levers 24, which are fulcrumed upon the lever-posts 4. Arms 25 are secured to project from the middles of said operating-levers and have pendent handles 26 attached to their ends.

A block 27 is transversely secured upon the face of the latch-post and has a curved upper edge, and two fingers or catches 28 are pivoted above said block so as to have their ends bear against the curved edge of said block at a short distance from each other and in a downwardly-converging position.

A stud 29 projects from the latch edge of the gate and may be held between said fingers or catches when the gate is closed. Gravitating catches 30 are pivoted upon arms 31, projecting from the retaining or abutment posts, and may engage said stud 29 when the gate is opened to either side. I do not wish to make any claim for this construction of the latch, but prefer to use said latch as the most suitable for the purpose. Any other form of latch, however, which will perform the same functions as this latch and will co-operate as effectively with the operating mechanism of the gate may be substituted for it.

When the gate is to be opened, one of the handles 26 is pulled down, which will tilt the lever upon the side post and draw upon the cord or chain, which passes around the circular back part of the pulley at the hinge-post. This will cause said cord or chain to pull upon the eccentric portion or bulge of the pulley to which it is secured and to revolve said pulley and the two-armed frame with it. This will tilt the gate backward or toward the hinge-post, and will consequently raise the latch end of the gate sufficiently to clear its lug or stud 29 from between the catches of the latch-post, whereupon the gate may swing around with the two-armed frame and pulley until its stud is caught by the gravitating latch of the abutment-post. When, now, the lever is tilted at the side of the gate to which it is opened, the gate will be swung back toward the latch-post, and upon arriving at said post the stud upon the gate will tilt one of the pivoted fingers or catches out of the way and slip under the same, being thereupon held between the two fingers or catches.

The eccentric or cam pulley will by its shape afford considerably more leverage for the cords, chains, or wires at the beginning of the pull upon them in opening the gate than later, as they will pull upon the bulge or cam portion at that time of the pull when it is desired to give the gate a quick swing for the purpose of starting it upon its travel toward the abutment-post.

Having thus fully described the construction and arrangement or combination of the several parts of my improved swinging gate, what I claim as new is—

In a swinging gate, the combination, with the hinge-post having the two upper sockets or eyes 5 and 6 and the lower socket 7, of the gate having the lower pintle 18 and the upper pintle 11, the two-armed frame 12, having the socket or eye 13 and the pintles 14 and 15, the eccentric or cam pulley 19, having the bulge 21, and the operating-cords 22 and 23, secured to said bulge, carried around said pulley in opposite directions, and provided with means for pulling their ends, substantially as described.

In testimony whereof I affix my signature in presence of two witnesses.

WILLIAM T. GRANT.

Witnesses:
J. M. McCULLOUGH,
F. J. BRONSON.